(12) United States Patent
Roy et al.

(10) Patent No.: US 7,804,962 B2
(45) Date of Patent: Sep. 28, 2010

(54) MODELING A SENSOR NETWORK DESIGN TO SECURE A NETWORK AGAINST ATTACK

(75) Inventors: Suman S. R. Roy, Bangalore (IN); Debaprivay Mukhopadhyay, West Bengal (IN); Chandrashekhara Thejaswi PS, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 940 days.

(21) Appl. No.: 11/610,172

(22) Filed: Dec. 13, 2006

(65) Prior Publication Data

US 2008/0144835 A1    Jun. 19, 2008

(51) Int. Cl.
*H04L 9/00* (2006.01)
(52) U.S. Cl. .............. 380/278; 340/539.22; 370/338
(58) Field of Classification Search ............ 380/278; 340/539.22; 370/338
See application file for complete search history.

(56) References Cited

U.S. PATENT DOCUMENTS

| 6,947,726 | B2 | 9/2005 | Rockwell |
| 7,304,976 | B2 * | 12/2007 | Mao et al. .................. 370/338 |
| 2004/0025018 | A1 | 2/2004 | Haas et al. |
| 2006/0053491 | A1 | 3/2006 | Khuti et al. |
| 2006/0059545 | A1 | 3/2006 | Stanforth |
| 2008/0084294 | A1 * | 4/2008 | Zhiying et al. ......... 340/539.22 |

OTHER PUBLICATIONS

Chris Karlof/ David Wagner, Secure routing in wireless sensor networks: attacks and countermeasures, 2003; pp. 293-315.*
Wenliang Du/Jing Deng/ Yunghsiang S. Han/ Pramod K. Varshney/ Jonathan Katz/ Aram Khalili, A Pairwise Key Predistribution Scheme for Wireless Sensor Networks, May 2005; pp. 228-258.*
Roberto Di Pietro/ Luigi V. Manchini/ Alessandro Mei, Random Key-Assignment for Secure Wireless Sensor Networks, 2003; pp. 62-71.*
K.D. Kang/ K. Lui/ N. Abu-Ghazaleh, Securing Geographic Routing in Wireless Networks, 2005; 12 pages.*
V. Shoup, "On the Security of a Practical Identification Scheme", Jul. 29, 1996, J. Cryptology, pp. 1-10.
R. Segala et al., "Probabilistic Simulations for Probabilistic Processes", Nordic Journal of Computing, vol. 2, Issue 2, Jul. 1997, pp. 1-24.
A. Perrig et al., "SPINS: Security Protocols for Sensor Networks", Mobile Computing and Networking 2001, pp. 1-11.
L. Eschenauer et al., "A Key-Management Scheme for Distributed Sensor Networks", Conf. on Computer & Communications Security, Nov. 2002, pp. 41-47.

(Continued)

*Primary Examiner*—Kieu Oanh Bui
*Assistant Examiner*—Michael Anderson
(74) *Attorney, Agent, or Firm*—Schiff Hardin LLP

(57) ABSTRACT

A wireless sensor network may be designed by modeling the network as a function of at least one design parameter and/or at least one threat parameter ∈, by assessing the model by varying the at least one design parameter to determine an effect on the at least one threat parameter ∈, and by choosing a value for the at least one design parameter based on the assessment that produces an acceptably low value for the at least one threat parameter ∈.

16 Claims, 10 Drawing Sheets

OTHER PUBLICATIONS

M. Y. Vardi, "Automatic Verification of Probabilistic Concurrent Finite-State Programs", 1985 IEEE, pp. 327-338.

N. Lynch et al., "Compositionality for Probabilistic Automata", Proceedings 14th Intl. Conf. on Concurrency Theory (CONCUR 2003), Springer-Verlag, 2003, pp. 1-15.

S. Roy et al., "A Sensor Network Design from a Probabilistic Automaton Model of Impersonation Attack", Sections 3, 4 and 5 published Jan. 5-8, 2006, pp. 1-7.

H. Chan et al., "Random Key Predistribution Schemes for Sensor Networks", IEEE Symposium on Security and Privacy, May 2003, pp. 1-17.

W. Du et al., "A Paiwise Key Pre-distribution Scheme for Wireless Sensor Networks", Conference of Computer and Communications Security, Oct. 27-30, 2003, pp. 1-10.

D. Liu et al., "Establishing Pairwise Keys in Distributed Sensor Networks", Conference of Computer and Communications Security, Oct. 27-31, 2003, pp. 1-10.

C. Blundo et al., "Perfectly-Secure Key Distribution for Dynamic Conferences", In Advances in Cryptology, Jun. 6, 1995, pp. 1-26.

Douglas R. Stinson, Section 4.2.1 "The Random Oracle Model, Section 4.2.2" Algorithms in the Random Oracle Model, Cryptography, Thoeory and Practice, 2nd Edition, Chapman and Hall/CRC, 2002, pp. 117-124.

* cited by examiner

MODELING A SENSOR NETWORK DESIGN TO SECURE A NETWORK AGAINST ATTACK

TECHNICAL FIELD

The technical field of the application relates to the design of a network, such as a wireless sensor network, so that the network can better withstand an attack such as an impersonation attack.

BACKGROUND

It is not difficult to foresee the evolution of self-organizing wireless networks that are formed from thousands, perhaps millions, of small sensors. The network can be ad hoc in nature resulting from the deployment of sensors in a random or pseudo-random manner. The sensors must then communicate with one another in order to organize themselves into a network so that they may implement their intended functions.

Such networks are attractive because they provide solutions in many applications such as wireless communication, remote monitoring, surveillance, etc. Applications involving wireless networks are particularly attractive where using wiring to interconnect nodes is difficult, or impossible, or too expensive, or where operating and supporting costs are prohibitively high.

Security in wireless sensor networks is important because many applications are dependent on the secure operation of the sensor networks, and have serious consequences if the network is compromised or disrupted by an attacker. For example, an attacker can modify messages and/or inject fresh messages into the network that subvert the operation of the network. The attacker can also impersonate a particular node in a network in order to intercept messages from other nodes.

For a secure design of a wireless sensor network, it is important to be able to encrypt and authenticate messages sent between sensor nodes in order to prevent attacks, such as impersonation attacks, eavesdropping attacks, honest verification attacks, etc. However, before messages can be encrypted and authenticated, keys for performing encryption and authentication must be agreed upon by the sensor nodes. Due to resource constraints, however, achieving key agreement in wireless sensor networks is a non-trivial matter.

Key pre-distribution schemes have been proposed that substantially improve the resilience and security of the network and associated overhead. These schemes rely on probabilistic key sharing among the nodes of a random network graph and use simple protocols for shared-key discovery and path-key establishment.

In addition, as discussed below, the securing of a wireless sensor network can be improved by the proper design of the network.

SUMMARY

In accordance with one aspect of the present invention, a method for designing a wireless sensor network comprises the following: assessing a degree of security of the wireless sensor network against a security threat to the wireless sensor network; and, estimating network design parameters for the wireless sensor network as a function of the degree of security.

In accordance with another aspect of the present invention, a method for designing a wireless sensor network comprises the following: modeling the network as a function of at least one design parameter and at least one threat parameter $\in$; assessing the model by varying at least one design parameter to determine an effect on the threat parameter $\in$; and, choosing a value for the design parameter based on the assessment that produces an acceptably low value for the threat parameter $\in$.

BRIEF DESCRIPTION OF THE DRAWINGS

These and other features and advantages will become more apparent from the detailed description when taken in conjunction with the drawings in which.

DETAILED DESCRIPTION

Figure 1:
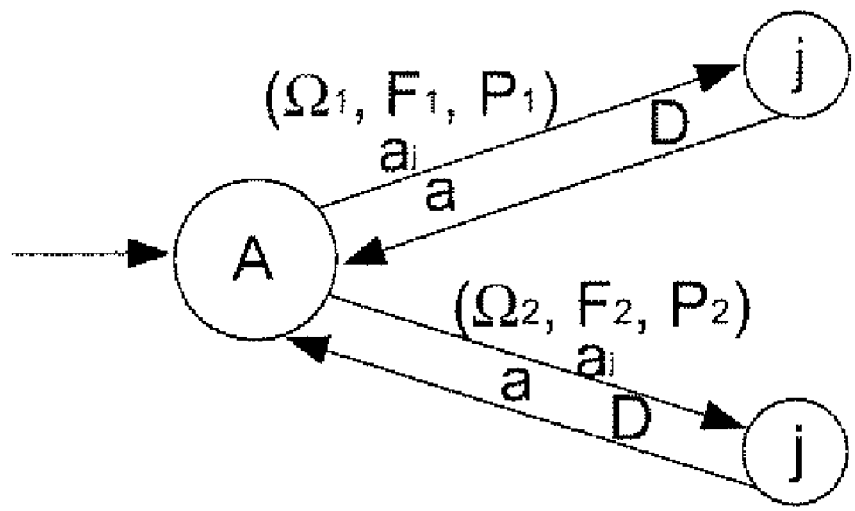
FIG. 1 illustrates a probabilistic automaton ΠA that models an impersonation attack.

An impersonation attack is modeled and analyzed below using a probabilistic automaton. This probabilistic automaton model is applicable in the design of sensor networks from the security point of view. The resilience of wireless sensor networks to attacks is examined by plotting several network parameters against a tolerance factor $\in$. These plots reveal interesting characteristics of the networks and, therefore, can serve as a reference for network design.

It is desirable for a probabilistic automaton to take into consideration the possibility that an attacker can corrupt sensors. Indeed, due to the key pre-deployment setting, a specific key can be assigned to multiple sensors. Therefore, as the number of sensors corrupted by the attacker increases, the probability that the set of keys shared by sensor nodes i, j will be available to the attacker increases. This possibility is taken into account herein.

I. Probabilistic Automata

A discrete probability space is a triplet $(\Omega, \Phi, \Pi)$ where $\Omega$ is a set, $\Phi$ is a σ-algebra over the set $\Omega$ such that $\Phi = 2^{|\Omega|}$, and $\Pi$ is a function from $\Phi$ to $[0,1]$ such that for each $C \in \Phi$, $P[C] = \Sigma_{x \in C} P[\{x\}]$. The Dirac measure over an element x denoted by $D(x)$ is the probability space with a unique element x. The symbol |.| denotes the cardinality of the set $\Omega$.

The following definition is adopted herein. A probabilistic automaton (ΠA) is a tuple $\Pi A = (Q, q_0, A, D)$, where Q is a set of states of the automaton, $q_0 \in Q$ is the start state, A is a finite set of actions, and $D \subseteq Q \times Probs((A \times Q) \cup \{\delta\})$ ($\delta$ is a deadlock condition) is a relation, where Probs(X) is the set of discrete probability spaces $(\Omega, \Phi, \Pi)$ and $\Omega \subseteq X$. The probabilistic automaton ΠA is fully probabilistic if is has a unique start state and from that state there is at most one enabled step.

Given a probabilistic automaton ΠA, given a finite or countable set $\{(\Omega_i, \Phi_i, P_i)\}_i$ of probability spaces of Probs((A× Q)∪{δ}), and given a positive weight $w_i$ for each i such that $\Sigma_i w_i \leq 1$, the combination $\Sigma_i w_i (\Omega_i, \Phi_i, P_i)$ of the distributions $\{(\Omega_i, \Phi_i, P_i)\}$ is the probability space $(\Omega, \Phi, \Pi)$ such that $$\Omega = \begin{cases} \bigcup_i \Omega_i & \text{if } \sum_i w_i = 1 \\ \sum_i \bigcup_i \Omega_i \cup \{\delta\} & \text{if } \sum_i w_i < 1 \end{cases}$$

$\Phi = 2^\Omega$ for each $(a,q) \in \Omega$, $P[(a,q)] = \Sigma_{(a,q) \in \Omega_i} w_i P_i[(a,q)]$ if $\delta \in \Omega$, then $P[\delta] = (1 - \Sigma_i w_i P_i[\delta])$.

where $a \in A$.

A pair $(q, (\Omega, \Phi, \Pi))$ is a combined step of ΠA if there exists a finite or countable family of transitions $\{(q, \{(\Omega_i, \Phi_i, P_i)\}_i$ and a set of positive weights $\{w_i\}_i$ with $\Sigma_i w_i \leq 1$ such that $(\Omega, \Phi, \Pi) = \Sigma_i w_i (\Omega_i \Phi_i P_i)$.

For notational convenience, $q \rightarrow (\Omega, \Phi, \Pi)$ is written whenever there is a simple step $(q, (\Omega, \Phi, \Pi))$ in ΠA, and $q \rightarrow_p (\Omega, \Phi, \Pi)$ is written whenever there is a combined step $(q, (\Omega, \Phi, \Pi))$ in ΠA.

An execution on ΠA is a finite or an infinite sequence $\alpha = q_0 a_1 q_1 a_2 q_2 \ldots$ of alternating states q and actions a, starting with a state $q_0$ and, if the sequence is finite, ending in a state $q_n$, where for each i there exists a probabilistic space Π such that $(q_i, \Pi) \in \Delta$ and $(a_{i+1}, q_{i+1}) \in \Omega$. Given a finite execution sequence $\alpha = q_0 a_1 q_1 a_2 q_2 \ldots q_n$, the first state fstate($\alpha$) of the execution sequence is denoted as $q_0$, and the last state lstate($\alpha$) of the execution sequence is denoted as $q_n$. Let exs(ΠA) denote the set of executions of ΠA and fexs(ΠA) denote the set of finite executions of ΠA. An empty execution set is given by λ. An execution may begin on the start state $q_0$ or some other state. For $\alpha \in$ fexs(ΠA), the length of the execution $\alpha$ may be defined as $\rho_\alpha = n$.

A finite execution $\alpha_1 = q_0 a_1 q_1 a_2 q_2 \ldots q_n$ and an execution $\alpha_2$ can be concatenated if fstate($\alpha_2$) = $q_n$. This concatenation is denoted as $\alpha = \alpha_1; \alpha_2$. A finite execution $\alpha_1$ is a prefix of an execution $\alpha$ (written as $\alpha_1 \subset \alpha$) if there exists another execution $\alpha_2 \neq \lambda$ such that $\alpha = \alpha_1; \alpha_2$.

A scheduler (also called an adversary) is an object that schedules the next step based on the past history of a probabilistic automaton (to resolve nondeterminism in probabilistic systems). An adversary for a probabilistic automaton ΠA is a function η taking a finite execution fragment α of ΠA and returning a probability distribution over ⊥ and a subset of steps enabled from lstate($\alpha$). The symbol ⊥ represents an undefined value that expresses the fact that an adversary is not allowed to schedule anyone at any point. Formally η: fexs (ΠA) → Probs(D ∪ {⊥}), such that if $\eta(\alpha) = (\Omega, \Phi, \Pi)$ and $(s, (\Omega', \Phi', \Pi')) \in \Omega$, then s = lstate($\alpha$). An adversary is deterministic if it returns only Dirac distributions, i.e., the next step is chosen deterministically.

An execution automaton $M = (Q, q_0, A, D)$ of a probabilistic automaton ΠA is a fully probabilistic automaton such that 1) $Q \subseteq$ fexs(ΠA).
2) For each step $(\alpha, (\Omega, \Phi, \Pi))$ of M, there is a combined step (lstate($\alpha$), $(\Omega', \Phi', \Pi')$) of ΠA, called the corresponding combined step, such that $\Omega' = \{(a,s) | (a, \alpha as) \in \Omega\}$, $\Phi' = 2^{\Omega'}$, and $\Pi'[(a,s)] = \Pi[(a, \alpha as)]$ for each $(a,s) \in \Omega'$. If $q = $ lstate($\alpha$), then $(\Omega, \Phi, \Pi)$ is denoted by $(\Omega_q, \Phi_q, \Pi_q)$.
3) Each step of M is reachable, i.e., for each $\alpha \in Q$ there exists an execution N(M) leading to state α where, given a probabilistic automaton ΠA, the nondeterministic reduction of state α is the probabilistic automaton N(ΠA) obtained from ΠA by transforming all the probabilistic behavior into nondeterministic behavior.

Given a probabilistic automaton ΠA, given a scheduler η, and given an execution fragment α ∈ exs(ΠA), the execution M(ΠA,η,α) of ΠA under scheduler η with starting fragment α is the execution automaton M whose start state is α such that, for each state q, there is a transition $(q, (\Omega, \Phi, \Pi))$ belonging to the transitions of M(ΠA,η,α) if and only if $\eta(q) \neq \perp$ and the corresponding combined step of $(q, (\Omega, \Phi, \Pi))$ is obtained from η(q).

A probability space $(\Omega_M, \Phi_M, \Pi_M)$ is defined for each execution automaton M so that it is possible to analyze the probabilistic behavior of an automaton once the nondeterminism is removed. The sample space $\Omega_M$ is the set of maximal executions of M, where a maximal execution of M is either infinite or finite and not extendible. Specific kinds of non extendible executions are finite executions α whose last state enables a step where δ has a positive probability. An execution of M can be uniquely denoted by the corresponding execution of ΠA. For each finite execution α of M, possibly extended with δ, $R_\alpha$ is the rectangle with prefix α and may be denoted as the set $\{\alpha' \in \Omega_M | \alpha \subseteq \alpha'\}$, and $R_M$ is the class of rectangles for M. The probability $\mu_M(R_\alpha)$ of the rectangle $R_\alpha$ is the product of the probabilities associated with each edge that generates α in M. This probability is well defined since the steps of M are described by discrete probability distributions. Formally, if $\alpha = q_0, a_1, q_1 \ldots q_{n-1}, a_n, q_n$, where each $q_i$ is an execution fragment of M, then $\mu_M(R_\alpha)$ is given by the following equation:

$$\mu_M(R_\alpha) \hat{=} P_{q_0}[(a_1, q_1)] \ldots P_{q_{n-1}}([a_n, q_n])$$

(M can be dropped to denote it as μ when it is clear from the context).

The probabilistic automaton ΠA is discussed further in Section V. below.

II. A Security Framework for Pre-Key Distribution Schemes

The establishment of an encryption key in a sensor network is a challenging problem because public key cryptosystems are unsuitable for use in resource-constrained sensor nodes, and also because the network nodes could be physically compromised by an adversary. Various key pre-distribution schemes have been proposed to tackle these problems. These schemes typically include selective distribution of keys to sensor nodes, the revocation of those keys, and node re-keying without requiring substantial computation and communication capabilities. They rely on probabilistic key sharing among the nodes of a random graph and use simple protocols for shared key discovery and path key establishment. Such schemes are composed of algorithms for key generation, key distribution, and key derivation.

A pairwise authentication scheme is now defined. A pairwise authentication scheme is simply a key pre-distribution scheme with an additional message authentication algorithm (Mac) and message verification algorithm (Vrfy).

Now, if nodes i,j establish a shared key $K_{ij} \neq \perp$, node i can authenticate its communication to node j as follows: before sending message m, node i computes a tag=Mac($K_{ij}$,m) (which is a hash function of the form h($K_{ij}$,m) and sends this tag along with the message m. Upon receiving (m,tag), node j accepts the message m only if Vrfy ($K_{ij}$, (m,tag))=1.

In other words, node i inputs the key $K_{ij}$ and the message m into the message authentication algorithm (Mac) to compute the tag, and transmits the message along with this tag. Node j inputs the key $K_{ij}$, the message m, and the tag into its message verification algorithm Vrfy and accepts the message m as authentic only if the output value provided by its message verification algorithm Vrfy is 1.

Node j can authenticate its communication to node i similarly.

III. Impersonation Attack in an Identification Scheme

A. Interactive Identification Scheme

An identification protocol or an entity authentication protocol allows one party to gain assurances that the identity of another party is authentic, thereby preventing impersonation. An identification protocol is presumed to be an interactive protocol, and the general setting for the protocol involves a prover or claimant whose identity is Π and a verifier whose identity is ζ. In general, the prover tries to convince the verifier that the prover's identity is Π. The verifier is presented with, or presumes beforehand, the purported identity Π of the prover. The goal of the verifier is to corroborate that the identity Π of the prover is indeed Π, i.e., to provide entity authentication. Only the prover knows the secret value corresponding to his public value, and this secret value is what is used convince the verifier V of the prover's identity.

B. Attack Model

When an identification scheme breaks down, an adversary succeeds in an impersonation attempt (making the verifier accept with non-negligible probability). Attacks can be classified according to the interaction allowed to the adversary before an impersonation attempt. The weakest form of attack is a passive attack, where the adversary is not allowed to interact with the system at all before attempting an impersonation; the only information the adversary has is the public key of the prover. Other attacks in an intermediate level, such as the eavesdropping attack or the honest-verifier attack, are essentially equivalent to a passive attack. The strongest form of attack is an active attack, in which the adversary is allowed to interact with the verifier several times, posing as the prover. Active attacks may be considered as adaptive chosen-cipher text attacks, which are quite feasible in practice.

IV. Modeling an Impersonation Attack Using a Probabilistic Automaton

As should be understood from the above discussion, an impersonation attack is a deception whereby one entity purports to be another. Although this attack is mainly modeled in the framework of an identification scheme, such an attack also can be considered in the context of a sensor network.

In a sensor network, the fundamental nature of communication is broadcast. Hence, such a network is vulnerable to control by an adversary. The adversary can modify messages and/or inject fresh messages into the network. The adversary can also try to masquerade as one node in order to get messages from other nodes. This attack can be modeled in terms of the probabilistic automaton described above. For example, the following random oracle model suggested by Douglas R. Stinson in Cryptography, Theory and Practice, 2nd Edition, Chapman and Hall/CRC, 2002 can be used for this purpose.

A hash family $(X,Y,K,H)$, where X is set of possible messages, Y is a set of authentication tags, K is a finite set of possible keys, and H is a set of hash functions, may be assumed. It can be also assumed that, for each key $k \in K$, there is a hash function $h(k, \cdot) \in H$ which is a map $h: K \times X \rightarrow Y$. It can be further assumed that X is a finite set, that Y is always a finite set, and that the following is true: $|X| \geq 2|Y|$. A pair $(x,y) \in X \times Y$ is valid for the key k if $h(k,x)=y$.

$F^{x,y}$ may be denoted as the set of all hash functions from X to Y. It may be supposed that $|X|=N_1$ and $|Y|=M$. Then, any hash family $F \subseteq F^{x,y}$ is termed as an $(N_1,M)$ family.

The objective of an adversary is to produce a pair $(x,y)$ that is valid under an unknown but fixed key k. The adversary is allowed to request (up to) q valid MACs (Message Authentication Codes) on messages $x_1, x_2, \ldots, x_q$ of his own choice. In this context, it is assumed that there is a random oracle that provides answers to the adversary's queries. Thus, the adversary obtains a list of valid pairs (under the unknown key k) $(x_1,y_1), (x_2,y_2), \ldots, (x_q,y_q)$ by querying the oracle with messages $x_1, x_2, \ldots, x_q$. Then, the adversary outputs the pair $(x,y)$ such that $x \notin \{x_1, x_2, \ldots, x_q\}$. If this pair $(x,y)$ turns out to be a valid pair with respect to the unknown key k, then the pair is said to be a forgery. If the probability that the adversary outputs a forgery is at least $\in$, then the adversary is said to be an $(\in,q)$ forger for the given Message Authentication Code. For a particular value of q, the deception probability $pd_q$ is defined to be the maximum value of E such that an $(\in,q)$ forger exists.

An $(N_1,M)$ hash family $(X,Y,K,H)$ is strongly universal provided that the following condition is satisfied for every x, $x' \in X$ such that $x \neq x'$, and for every y, $y' \in Y$:

$$|\{k \in K : y = h(k, x), y' = h(k, x')\}| = \frac{|K|}{M^2}.$$

The authentication codes derived from strongly universal hash families attain minimum possible deception probabilities and both of the deception probabilities $pd_0$ and $pd_1$ are equal to 1/M, where M is the number of possible tags. The subscript 0 in the deception probability $pd_0$ indicates that the adversary is allowed to make any number of queries q, and the subscript 1 in the deception probability $Pd_1$ indicates that the adversary is allowed to make only one query.

Now the attack can be modeled. The existence of an adversary Adv in the network who will try to launch an impersonation attack by masquerading as a particular node, say node i, is assumed. The adversary Adv will attempt to send suitable messages to nodes other than i in order to be falsely authenticated by the other nodes. To do this, the adversary Adv picks node j and tries to guess the symmetric key $k_{ij}$ shared by i and j. The adversary Adv then tries to find a (universal) hash value $h(k_{ij},m)$ for a selected message m, which is not the list of messages in the random oracle, and sends it to node j. (In the random oracle model, an adversary is allowed to make oracle queries to get message tag pairs that are valid under an unknown key). The node j tries to validate the pair $(m,h(k_{ij},m))$ using its verification algorithm. If the node j fails to validate the pair $(m,h(k_{ij},m))$, the adversary Adv chooses another node and sends it a message along with a tag in the same manner and so on until it is successful. Thus, this protocol is given by the following:

Adv→j: i,m|h($k_{ij}$,m)

j→Adv: Yes, No

It may be assumed that there are N nodes in a wireless sensor network. The action of sending a message by the adversary Adv to the node is denoted $j \in \{0, 1, 2, \ldots, N\} \setminus \{i\}$ for authentication by $a_j$. When the node j receives the message tag pair, it runs the verification algorithm Vrfy. The node j accepts the message if the outcome is 1 and tells the adversary Adv the outcome (Yes). This action is denoted by a.

The probabilistic automaton ΠA that captures the impersonation attack is now described in connection with FIG. 1. As before, let $\Pi S=(Q,q_0,A,D)$ where $Q=\{1, 2, \ldots, N\} \cup \{A\}$, $q_0=A$, $A=\{a_j : j \in \{0, 1, 2, \ldots, N\} \setminus \{i\}\} \cup \{a\}$, and D allows the transitions $A \xrightarrow{a_j} j$, $j \xrightarrow{a} A$ (deterministic transitions) for all $j=1, 2, \ldots, N$, $j \neq i$.

This protocol of pairwise authentication of messages will be called $(N,\in)$ secure if, for any $(i,j)$, there exists an execution $\alpha = q_0 a_j q_j a q_0 a_k q_k a q_0 \ldots q_0$ such that the adversary is successful at the end of this execution, such that $\mu(R_\alpha) \leqq \in$, and such that $\rho_\alpha$ is the length of the execution sequence and is a polynomial in N, where N is the number of nodes in the network.

V. A Key Pre-Distribution for Sensor Networks

A pre-distribution scheme is described by L. Eschenauer and V. D. Gligor, in *A key-management schemes for sensor networks*, Proc. Of the 9th ACM Cont. On Computer and Communications Security, pages 41-47, November 2002. This scheme requires memory storage for only a few tens of keys to a couple of hundred keys, and yet has similar security and superior operational properties when compared to those of the pairwise private key-sharing scheme. This scheme relies on probabilistic key sharing among the nodes of a random graph and uses a simple shared-key discovery protocol for key distribution, revocation, and node re-keying.

Prior to deployment of a wireless sensor network, a ring of keys is distributed to each sensor node. Each key ring consists of keys chosen randomly from a larger fixed pool of keys, which is generated off-line. Because of the random choice of keys for the key rings, a key may not be shared by some pair of nodes. However, although two (a pair of) nodes may not share a key, if a path of those nodes that do share keys pairwise exists between these two nodes at network initialization, these two nodes can use that path to exchange a key that establishes a direct link.

In this key-management scheme, the key-distribution consists of the following three phases: key pre-distribution; shared key discovery; and, path-key establishment.

Phase 1: During the key pre-distribution phase, a large pool $\Phi$ of keys, $|\Phi|=s$, is generated along with their key identifiers. The setup server randomly generates this set of keys $\Phi$. For each sensor node, the setup server then randomly picks a subset $\Phi'$ of $s'$ keys from $\Phi$ to form the key ring for each sensor node and assigns each key subset to its corresponding sensor node.

Phase 2: Since the setup server does not pre-distribute enough information to sensors for key share discovery, the sensors that need to establish a pairwise key have to discover a common key using known real-time discovery techniques. This shared key discovery phase takes place during sensor node initialization in an operational environment during which the node discovers its neighbors within wireless communication range. The node shares keys with these neighbors. The simplest way for any two nodes to discover if they share a key is for each node to broadcast, in clear text, its list of identifiers for the keys on its key ring.

Phase 3: If two nodes fail to establish a pairwise key directly, they must start the path key establishment phase. During the path key establishment phase, a source sensor node tries to find another node that can help set up a common key with the destination node. For example, if node a finds that it does not share a common key with node b, it finds a node c such that nodes a and c share a common key and such that nodes b and c share a common key. Thereafter, when node a wishes to communicate with node b, node a will have to do so using the path a to c to b.

A. A Security Analysis

A graph with vertices and edges is formed for the sensor network. The vertices of the graph are the nodes of the sensor network, and each edge of the graph is the communication path that connects a corresponding pair of nodes if and only if this pair of nodes can establish a direct key and can communicate on a certain transmission frequency. This graph is called a key sharing graph. It is assumed here that the key sharing graph is fully connected. N denotes the total number of nodes in the network, s denotes the number of keys in the key pool, and s' denotes the number of keys in the key ring assigned to each of the sensor nodes, where s>Ns'.

The probability that two sensor nodes share a common key can be calculated. Two probability calculation cases may be considered.

Case 1: The two nodes share a direct key. The probability that nodes i and j, chosen from among N nodes, do not share a key (also called pairwise mismatch) is given by the following equation:

$$p = \frac{\binom{s}{s'}\binom{s-s'}{s'}}{\binom{s}{s'}\binom{s}{s'}} \quad (1)$$

$$= \frac{((s-s')!)^2}{(s-2s')!s!}$$

$$= \left(1-\frac{s'}{s}\right)\left(1-\frac{s'}{s-1}\right)\cdots\left(1-\frac{s'}{s-s'+1}\right)$$

The probability $p_1$ that two nodes do share the same key is estimated as $p_1=1-p$.

Case 2: The two nodes share an indirect key. This case occurs where two sensor nodes establish a key through both polynomial share discovery and path discovery. Let d denote the average number of one-hop neighbor nodes that each sensor node can contact. Any of these d neighbor nodes may be considered. The probability that this neighbor node shares a pairwise key with both a source node and a destination node is $p_1^2$. As long as one of the d nodes can act as an intermediate node between the source and destination nodes, the source and destination nodes can establish a common key. It follows that the probability of two sensor nodes establishing a pairwise key (directly or indirectly) is $p_2=1-p(1-p_1^2)^d$.

B. An Analysis of the Attack

As discussed above in relation to FIG. 1, a probabilistic automaton is given by $\Pi A=(Q,q_0,A,D)$, where $Q=\{A\}\cup\{j: 1\leqq j\leqq N, j\neq i\}$, $q_0=A$, $A=\{a_j,a\}$, $D=\{(A,(\Omega_1,\Phi_1,P_1)), (A,(\Omega_1,\Phi_2,P_2)), (j,\Delta)\}$. Further, $A\xrightarrow{aj}(\Omega_1,\Phi_1,P_1)$, $A\xrightarrow{aj}(\Omega_2,F_2,P_2)$, $j\xrightarrow{a}D$. Transition probabilities can be calculated for this probabilistic automaton.

Let $E_1$ denote a failure by an adversary to deceive node j, let $E_2$ denote the existence of a shared key between i and j, and let $E_3$ denote that nodes i and j are picked up (i.e., an adversary chooses node i, for example, and then picks node j).

The probability $P(E_1,E_2,E_3)$ may be computed according to the following equation:

$$P(E_1, E_2, E_3) = P(E_1/E_2, E_3) \cdot P(E_2/E_3) \cdot P(E_3)$$

$$= (1-pd_0) \cdot P_i \cdot \hat{p}_j$$

where $1\leqq i\leqq 2$, where $pd_0$ is the deception probability described above, and where $\hat{p}_j$, $j\in\{1,\ldots,N\}$, is the probability that node j is selected by the adversary after it has masqueraded as node i. Similarly, if $E_1^c$ denotes the event that the adversary is successful, then $P(E_1^c,E_2,E_3)=P(E_1^c/E_2,E_3) \cdot P(E_2/E_3) \cdot P(E_3)=pd_0 \cdot p_i \cdot \hat{p}_j$, $1\leqq i\leqq 2$.

The probability space $(\Omega_i,F_i,P_i)$ is not defined in detail herein. However, $P_i[(a_j,j)]$ is estimated by $P(E_1,E_2,E_3)$. Consequently, $P_1[(a_j,j)]=(1-pd_0) \cdot p_1 \cdot (1/(N-1))$, $P_2[(a_j,j)]=(1-$ $pd_0 \cdot p_2 \cdot (1/(N-1))$. Similarly $P_i[(a,j)]$ can also be estimated by $P(E_1^c, E_2, E_3)$ in an appropriate case.

It may be assumed that the role of the adversary includes resolving non-determinism in the probabilistic automaton (FIG. 1) Under the action of the adversary, an execution automaton M can be built. An execution fragment $\alpha_1 = Aa_j j$ may be considered. It may be assumed that the adversary assigns $$\eta((Aj) * A) = \frac{1}{2}.$$

For the combined step from A to node j, the probability that an adversary using execution automaton M selects node j is given by the following equation:

$$P_M[(a_j, j)] = \frac{1}{2} \Box P_1[(a_j, j)] + \frac{1}{2} P_2[(a_j, j)]$$

$$= \frac{1}{2(N-1)} \Box (1 - pd_0)[p_1 + p_2]$$

$$= \frac{1}{2(N-1)} \Box (1 - pd_0)(1 - p)\left[1 + p^d(2 - p)^d\right]$$

For the execution fragment $\alpha_2 = jaA$, $P_M[(a,A)] = 1$. The probability measure of the execution fragment $\alpha_3 = Aa_j jaA$ can be calculated accord to the following equation:

$$\mu(R_{\alpha_3}) = P_M[(a_j, j)] \cdot P_M[(a, A)]$$

$$= \frac{1}{2(N-1)} \cdot (1 - pd_0)(1 - p)\left[1 + p^d(2 - p)^d\right].$$

Similarly, the deception probability is given in accordance with the following equation:

$$P'_M[(a_j, j)] = \frac{pd_0}{2(N-1)} \cdot (1 - p)\left[1 + p^d(2 - p)^d\right].$$

Consider an execution fragment $\alpha = Aa_j jaAa_j jaA \ldots A$ where the adversary succeeds in deceiving node j. The execution fragment has a length $\rho_\alpha = 2\Box\kappa$, where $\kappa$ may be a polynomial in the number of nodes N. A polynomial in the number of nodes N means that $\kappa$ can be of the form $\kappa = a_0 + a_1 N + a_2 N^2 + \ldots + a_m N^m$, for some $m > 0$.

In this case, the probability $\mu(R_\alpha)$ is given by the following equation:

$$\mu(R_\alpha) = P_M[(a_j, j)] \cdot P_M[(a, A)] \ldots P'_M[(a_j, j)] \cdot P'_M[(a, A)] \quad (2)$$

$$= \frac{(1 - pd_0)}{2(N-1)} \cdot (1 - p)\left[1 + p^d(2 - p)^d\right] \cdot \frac{(1 - pd_0)}{2(N-1)} \cdot$$

$$(1 - p)\left[1 + p^d(2 - p)^d\right] \ldots \frac{pd_0}{2(N-1)} \cdot (1 - p)$$

$$\left[1 + p^d(2 - p)^d\right]$$

$$= \frac{pd_0}{(1 - pd_0)}\left[\frac{1}{2(N-1)} \cdot (1 - pd_0)(1 - p)\right.$$

$$\left. \left(1 + p^d(2 - p)^d\right)\right]^K$$

For the pairwise scheme to be $(N, \in)$ secure, $\mu(R_\alpha) \leqq \in$.

C. A Network Design from the Model

Considering the above framework of attack, the number of sensor nodes in a network is estimated as a function of the security parameter $\in$. Also, the connectivity parameter d (i.e., the average number of neighbor nodes with which a sensor can establish a one-hop link) is estimated as function of the security parameter $\in$. These estimations help in understanding the significance of the connectivity parameter d while achieving the desired security for the network.

Equation (2) can be re-written as the following equation:

$$f(N, d, \varepsilon) \triangleq \frac{pd_0}{(1 - pd_0)}\left[\frac{1}{2(N-1)}(1 - pd_0)(1 - p) \right. \quad (3)$$

$$\left. \left(1 + p^d(2 - p)^d\right)\right]^K - \varepsilon$$

$$= 0$$

Based on the impersonation model given by equation (3), the following cases are considered and are plotted as N versus $\in$. In equation (3), it is assumed that M=400 so that $pd_0 = 1/400$. In all of the figures listed below, $s_1$ is read as s'.

In equation (3), it should be remembered that E is the security parameter relating to the probability of a forgery, $\kappa$ is a polynomial in N, $pd_0$ is a deception probability and is equal to 1/N, M is the number of authentication tags, s is the number of keys in the pool from which keys that are assigned to each node are chosen, s' is the number of keys assigned to each node, N is the total number of nodes in the network, p is the probability that two nodes in the network do not share a common key and is given by equation (1), and d is the average number of nodes within the transmission range of any given node.

Figure 3:
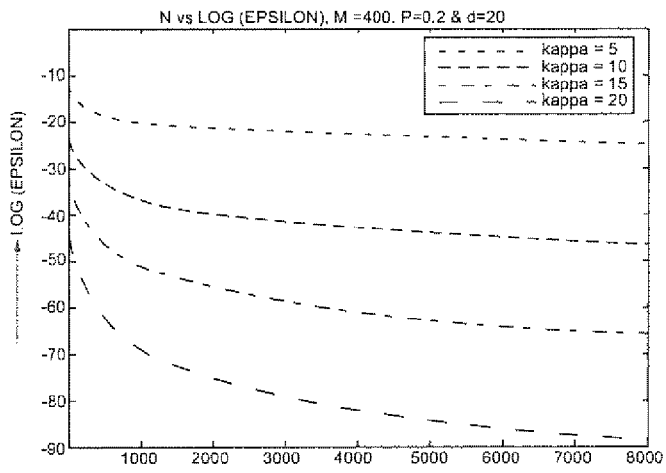

Case 1) (FIG. 3): s=20, s'=2. Hence, p=0.2. The connectivity parameter d is assumed to be 20.

Figure 4:
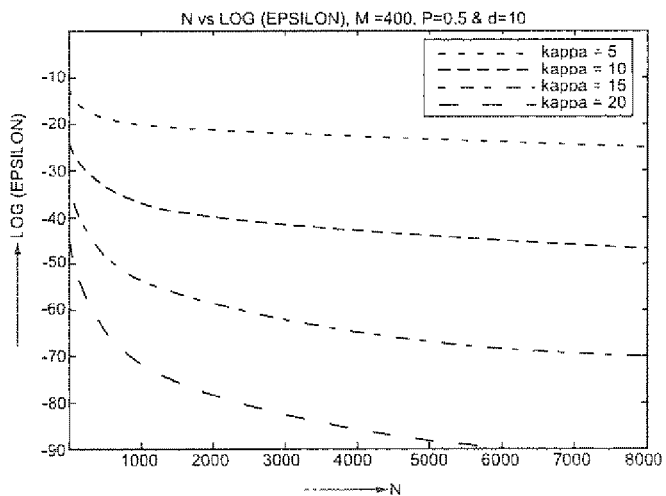

Case 2) (FIG. 4): s=55, s'=6. Hence, p=0.5. The connectivity parameter d is assumed to be 10.

Figure 5:
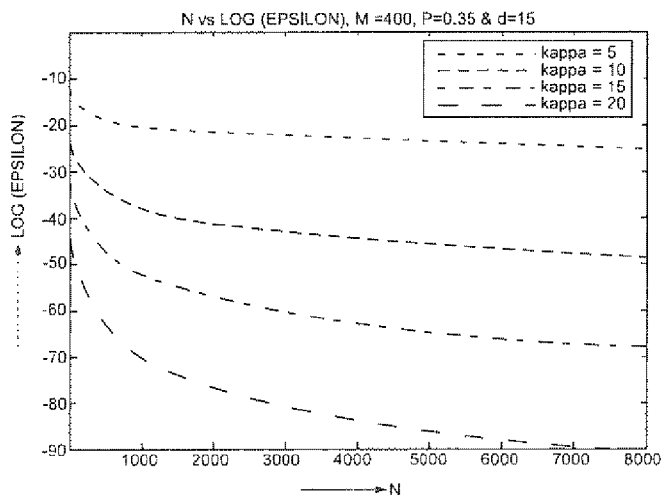

Case 3) (FIG. 5): s=40, s'=4. Hence, p=0.35. The connectivity parameter d is assumed to be 15.

Further, the following cases are considered and are plotted as d versus $\in$. In all of these cases, $\kappa = 5$.

Case 1) (FIG. 6): s=20, s'=2. Hence, p=0.2.

Case 2) (FIG. 7): s=55, s'=6. Hence, p=0.5.

Case 3) (FIG. 8): s=40, s'=4. Hence, p=0.35.

Figure 6:
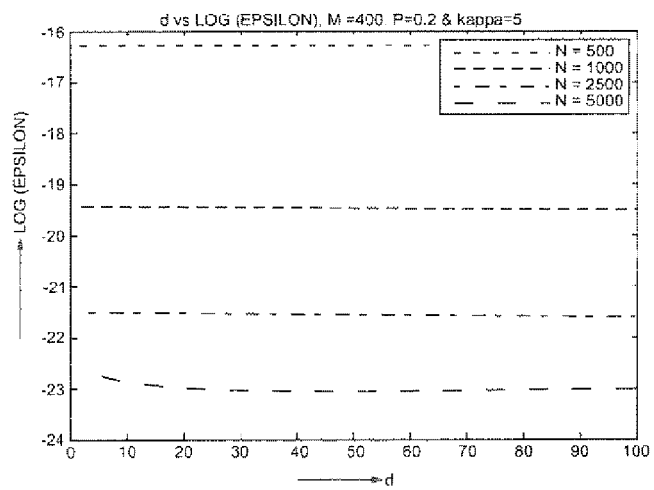
Figure 7:
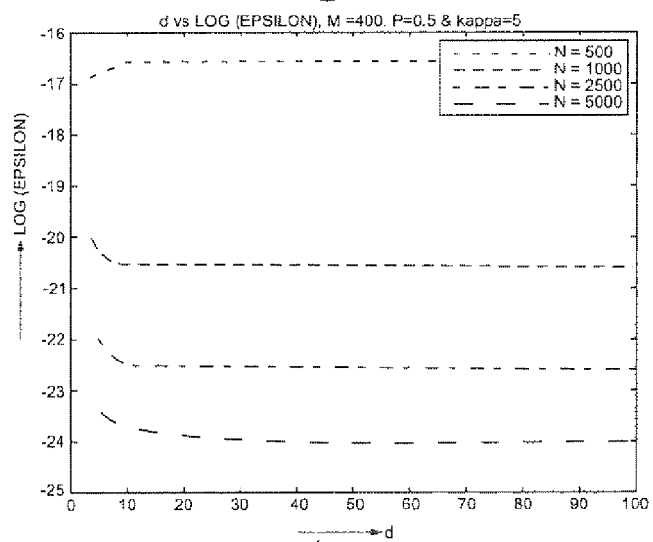
Figure 8:
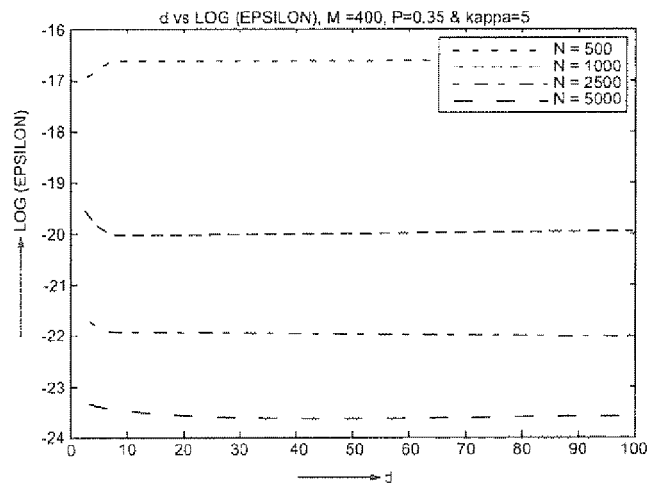

From the plots it is apparent that, with both network size N and average number of neighboring nodes d increasing, the tolerance $\in$ goes down, which aptly captures the fact that the resilience of the underlying key pre-distribution scheme will be higher (although, in FIGS. 6, 7, and 8, the slope is almost horizontal). Thus, because $\in$ also captures the probability that an impersonation attack is successful, the network is more resilient to an impersonation attack as the tolerance $\in$ decreases, i.e., as the tolerance $\in$ decreases, it is harder for an attacker to successfully impersonate a node.

VI. A Polynomial Based Key Pre-Distribution Scheme and its Security Analysis

The key pre-distribution scheme described in Section V can be referred to as a basic probabilistic key pre-distribution scheme, where keys are randomly selected from a key pool and are distributed among sensor nodes. Combining the polynomial based key pre-distribution scheme with this basic probabilistic key pre-distribution scheme produces the polynomial pool based random key pre-distribution scheme proposed by Donggang Liu and Peng Ning, in *Establishing pairwise keys in distributed sensor networks*, Proceedings of the 10th ACM conference on Computer and communication security, pp. 52-61, 2003. It has also been shown by Donggang Liu and Peng Ning that this scheme increases security over the basic probabilistic key pre-distribution scheme. In this section, this polynomial based random key pre-distribution scheme is briefly reviewed and also a security analysis is provided for it. Then, an impersonation attack under the probabilistic automaton model is analyzed to be able to relate the parameters of the scheme with the desired security tolerance.

A. A Polynomial Pool Based Key Pre-Distribution Scheme.

A t-degree symmetric bi-variate polynomial $$f(x, y) = \sum_{i,j=0}^{t} a_{ij} x^i y^j$$

over a finite field $F_q$, where q is a large prime, is randomly chosen by the key setup server. It is assumed that each sensor node has a unique ID. For each node i, the setup server computes a key share f(i,y) and this single variate polynomial share is pre-distributed to node i. Thus, for any two sensor nodes i and j, node i can compute the key f(i,j) by evaluating f(i,y) at point j, and node j can compute the same key f(j,i) f(i,j) by evaluating f(j,y) at point i. This scheme is t-collusion resistant since a coalition of up to t compromised sensor nodes do not reveal the bivariate polynomial and hence the pairwise key between any two non-compromised nodes still remains secure.

A random key pre-distribution technique based on the polynomial based scheme described above is called polynomial pool based key pre-distribution. In this scheme, pairwise key establishment is done in three phases, much the same way as in the originally described key pre-distribution scheme: setup, direct key establishment, and path key establishment.

Setup: The setup server randomly generates a pool S of bi-variate t-degree symmetric polynomials over the finite field $F_q$ such that |S|=s. For each sensor node i, the setup server then randomly picks a subset $S_i$ of S with $|S_i|$=s', and for each f∈$S_i$, assigns the polynomial share f(i,y) to node i. It is recommended that this random selection of subsets should be evenly distributed over S.

Direct Key Establishment: The main issue in this phase is the polynomial share discovery problem, which determines how to find a common bi-variate polynomial which both nodes share. One simplest way to do so is to let two sensors exchange the IDs of polynomials which they have, and then to identify the common polynomial. This method of establishing keys has a drawback as it reveals the subset assignment ($S_i$) pattern among nodes to the adversary.

An alternate method, which hides this information from an adversary, is described in the Eschenauer and Liu papers cited above and is called private shared-key discovery and uses a challenge response protocol. A pairwise key established in this phase is called a direct key and, henceforth, the secure link that is established using this key is referred as a direct link.

Path Key Establishment: If two sensors fail to establish a direct key, then they need to initiate a path key establishment phase. To establish a pairwise key with node j, sensor node i needs to find a sequence of nodes between itself and node j such that any two adjacent nodes in this sequence can establish a direct key. Such a sequence of nodes is called a key path and the key established in this way is called an indirect key and, henceforth, the secure link established using this key is referred as an indirect link. In this context, it is assumed that two adjacent nodes in a path not only can establish a direct key, but also they are neighbors of each other with respect to wireless communication range.

B. Security Analysis

As before, the security of the polynomial pool based key pre-distribution scheme can be probabilistically determined in two different cases.

Case 1: Two nodes share a direct key. When two nodes establish a direct key for secure message authentication, it can be assumed that the two nodes share a common bivariate polynomial. In this case, an adversary can achieve success either by compromising the common bivariate polynomial between the two nodes or by launching a successful attack on the message authentication algorithm (MAC).

The probability of launching a successful attack on the message authentication algorithm (MAC) when an adversary is allowed to make q oracle queries is given by $Pd_q$, which has already been discussed in section IV. The probability $P_{cd}$ that a bivariate polynomial (common key space) is compromised is now calculated.

From the security analysis of C. Blundo, A. De Santis, A. Herzberg, S. Kutten, U. Vaccaro, and M. Young in "Perfectly-secure key distribution for dynamic conferences," Advances in Cryptology—CRYPTO'92, LNCS, vol. 740, pp. 471-486, 1993, it follows that an adversary can only determine non-compromised keys established with a polynomial only if it has compromised more than t sensor nodes that possess shares of this polynomial. It may be assumed that an adversary has compromised $N_c$ sensor nodes out of the total of N nodes in a network. Thus, for $N_c \leq t$, $P_{cd}$=0.

The case when $N_c$>t is now considered. Let f be any polynomial in S. The probability of f being chosen for a sensor node is S'/S' and the probability of this polynomial being chosen exactly i times among $N_c$ compromised sensor nodes is given by the following equation:

$$P[i \text{ compromised shares}] = \frac{N_c!}{(N_c - i)!i!}\left(\frac{s'}{s}\right)^i \left(1 - \frac{s'}{s}\right)^{(N_c - i)}$$

Thus, the probability of a particular bivariate polynomial being compromised (when $N_c \geq t$) is given by the following equation:

$$P_{cd} = 1 - \sum_{i=0}^{t} P[i \text{ comprised shares}].$$

Let A denote the fact that two nodes share a direct key, let B denote the fact that the common key space between them is compromised, and let C denote the fact that an attack against the message authentication algorithm (MAC) is successful. The independence between the events B and C can be safely assumed. Then, the probability that a direct link between two non-compromised nodes is not broken is given by the following equation:

$$P_{direct} = P(A) \Box P(B^c \cap C^c) = p(1-P_{cd})(1-Pd_q)$$

where the superscript c in the above equation represents complement. Similarly when the link is compromised, the probability is given by $P'_{direct} = 1 - P_{direct}$.

Case 2: Two nodes share an indirect key. When two nodes fail to establish a direct key, they will establish an indirect key through path discovery. In this context, it may be assumed that the topology of the network guarantees that such a pair of nodes will always be able to find an intermediate node with which both of the end nodes can establish a direct key thereby helping to establish an indirect key through path discovery. Now, an adversary can achieve success through any one of the following ways: by compromising an intermediate node facilitating the key establishment; by compromising the common bivariate polynomial between an intermediate node and at least one of the end nodes (who are trying to establish the key); or, by launching a successful attack on the message authentication algorithm (MAC).

Let A denote the fact that two nodes share an indirect key, let B denote the fact that the intermediate node is compromised, let C denote the fact that the common bivariate polynomial of the intermediate node with at least one of the nodes is compromised, and let D denote the fact that an attack against the message authentication algorithm (MAC) is successful. The independence between the events B, C, and D can be safely assumed.

Then, the probability that an indirect link between two non-compromised nodes is not broken is given by the following equation:

$$P_{indirect} = P(A) \Box P(B^c \cap C^c \cap D^c)$$
$$= (1-p)\left(1 - \frac{N_c}{N}\right)(1-P_{cd})^2(1-Pd_q)$$

Similarly when there is a compromise, the probability is given by $P'_{indirect} = 1 - P_{indirect}$.

Therefore, the probability that any secure link (direct or indirect) between two non-compromised nodes is not compromised can be estimated by, $$P_{secure} = P_{direct} + P_{indirect}$$
$$= (1-P_{cd})(1-Pd_q)\left[p + (1-p)\left(1 - \frac{N_c}{N}\right)(1-P_{cd})\right]$$

Similarly, $P_{insecure} = 1 - P_{secure}$.

The model of the Probabilistic Automaton in FIG. 1 can now be considered. Again, the transition probabilities are calculated. Here, $P_M[(a_j,j)] = P_{secure}$, i.e., when the adversarial attack is not successful, is estimated. Similarly, $P'_M[(a_j,j)]$ can also be estimated by $P_{insecure}$ when there is a deception. Consideration is given to an execution fragment $\alpha = Aa_j j a Aa_j j a' A \ldots A$ when the adversary succeeds in deceiving node j and the length of the execution fragment is $\rho_\alpha = 2 \Box k$ (where κ may be a polynomial in the number of nodes N). In this case, $$\mu(R_\alpha) = P_M[(a_j, j)] \Box P_M[(a, A)] \cdots P'_M[(a_j, j)] \Box P'_M[(a, A)] \quad (4)$$
$$= P_{secure}^{(k-1)} \Box P_{insecure}$$

For the pairwise scheme to be (N,∈) secure, it is required again that $\mu(R_\alpha) \leq \in$. Equation (4) can be rewritten as follows:

$$f(N_C/N, t, \varepsilon) \triangleq P_{secure}^{(k-1)} \cdot P_{insecure} - \varepsilon \quad (5)$$

Using the model of equation (5), the following cases are considered and are plotted as $N_c/N$ versus ∈. As before, it is assumed that M=400 so that $pd_0 = 1/400$.

Figure 9:
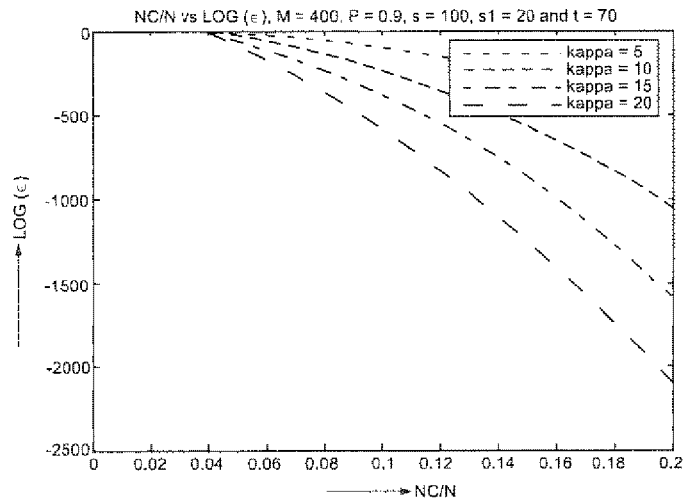
Figure 10:
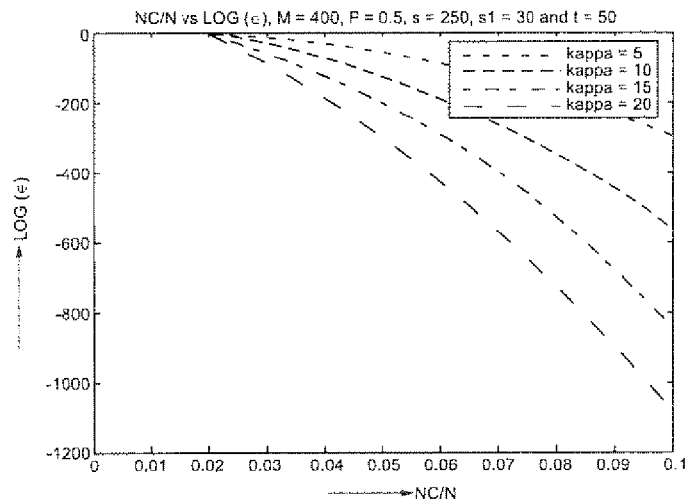
Figure 11:
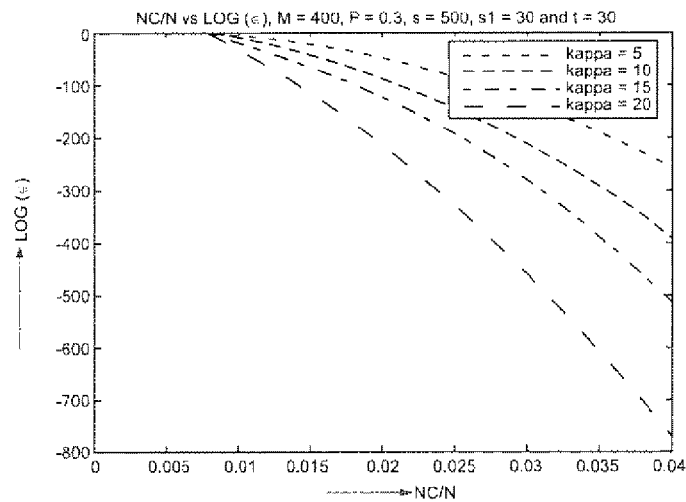

Case 1) (FIG. 9): s=100, s'=20, p=0.9. The threshold t of compromised nodes is assumed to be 70.
Case 2) (FIG. 10): s=250, s'=30, p=0.5. The threshold t of compromised nodes is assumed to be 50.
Case 3) (FIG. 11): s=500, s'=40, p=0.3. The threshold t of compromised nodes is assumed to be 30.

Figure 12:
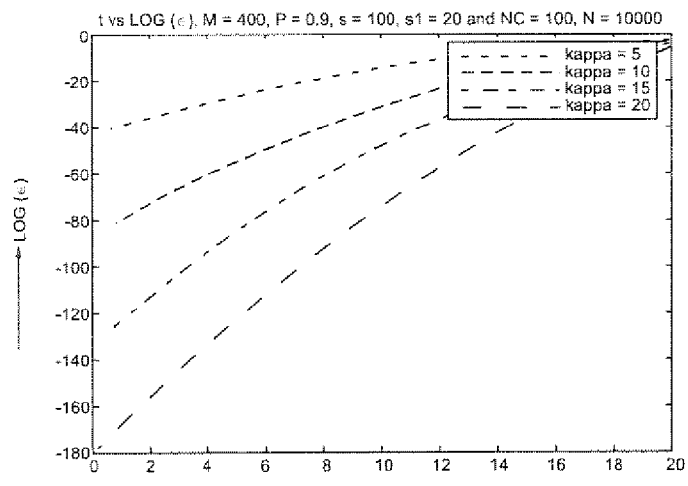
Figure 13:
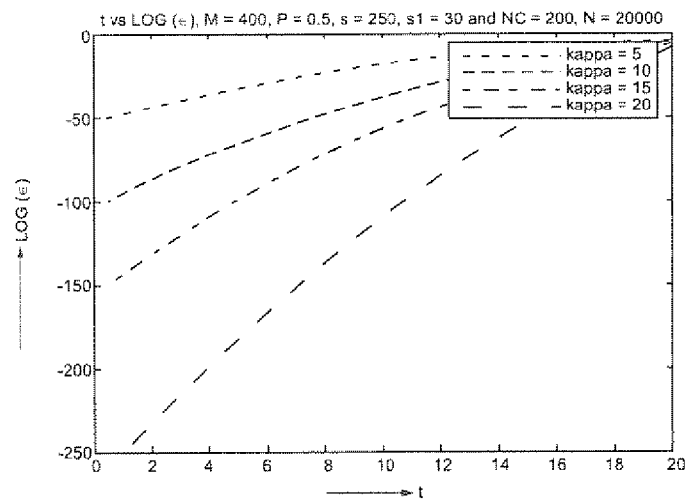
Figure 14:
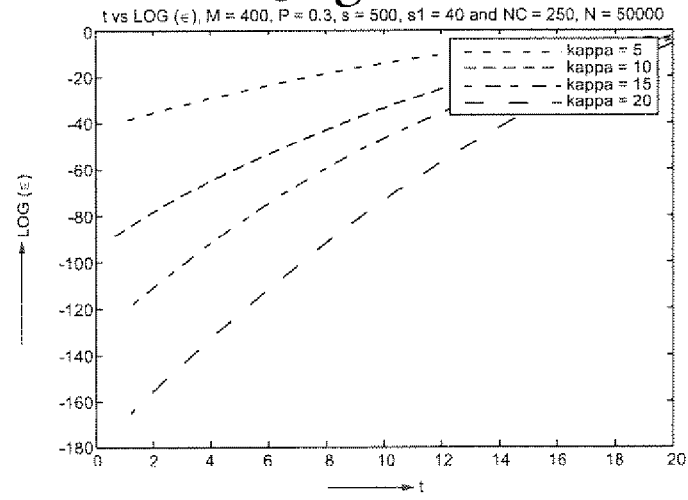

The following cases are considered and are plotted as t versus ∈. It is assumed that κ=5 in all cases.
Case 1) (FIG. 12): s=100, s'=20, p=0.9. It is assumed that N=10,000 and $N_c$=100.
Case 2) (FIG. 13): S=250, s'=30, p 0.5, It is assumed that N=20,000 and $N_c$=200.
Case 3) (FIG. 14): s=500, s'=40, p=0.3. It is assumed that N=50,000 and $N_c$=250.

It can be seen from the plots that, as the parameter $N_c/N$ increases, the tolerance ∈ decreases. However, it can be seen that, as the parameter t increases, the tolerance ∈ increases. Since these curves are parabolic (instead of hyperbolic), these graphs demonstrate the fact that the polynomial scheme improves the security over the basic probabilistic key pre-distribution scheme (which is also mentioned above).

Figure 2:
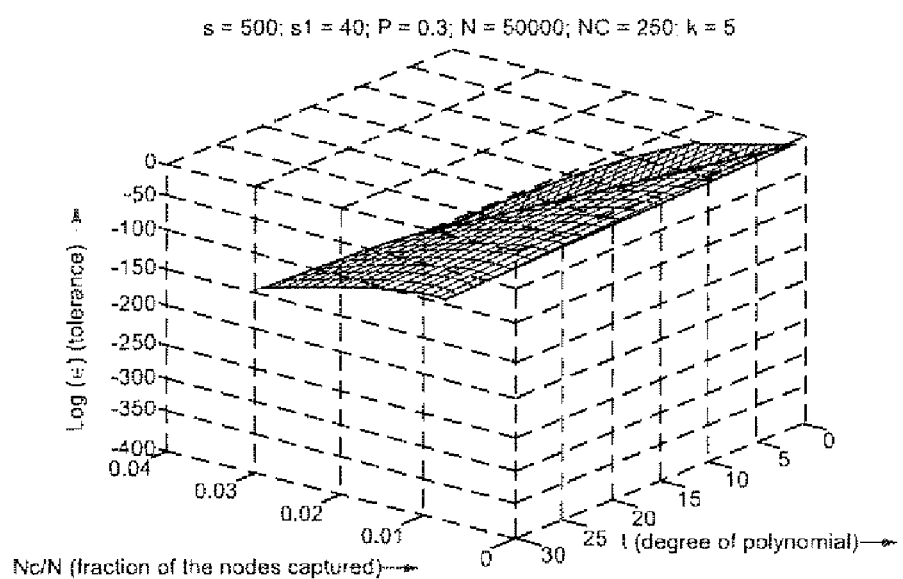
FIGS. 2-14 illustrate plots that are useful in explaining the design network parameters that help a network better withstand an impersonation attack.

FIG. 2 shows a plot of log(∈) against different values of $N_c/N$ (i.e., the fraction of nodes captured) and t (the degree of the polynomial).

Equations (3) and (5) represent two frameworks for analysis. Equation (3) is used to consider a basic probabilistic pre-key distribution for sensor networks. Equation (5) is used to consider a polynomial based key pre-distribution scheme. The same security analysis is used in connections with both equations. Both equations can be used in considering the formulation of a network that has a predetermined tolerance ∈ to attacks. However, these equations will give estimates of different network parameters. Thus, equation (3) gives an estimate of parameters N and d, whereas equation (5) gives an estimate of parameters $N_c/N$ and t.

As can be seen, the unattended operation of sensors in hostile areas gives rise to the possibility of capture of sensor nodes by an adversary. Although a node capture is a general threat that affects all security mechanisms, and not just the key ring belonging to any node, the resiliency of a key management scheme to such a threat is worth examining. One level of threat is that of active manipulation of a sensor's data-inputs, like the impersonation attack considered above. Although this threat does not necessarily require a physical attack against a sensor, it does imply that an adversary can disseminate bogus data in a wireless sensor network. It is difficult to prevent such an attack and it may not be practical, or even possible, to detect the attack by physical network surveillance (e.g., by satellite or aerial imagery). In general, detection of such attacks is especially difficult since sensor nodes may not necessarily communicate in an erratic or anomalous manner. However, a network design that is resilient to such attacks would automatically take care of such an issue.

As the fundamental nature of communication is broadcast in the wireless environment and the nature of network is ad-hoc, a probabilistic notion of security is very important, which highlights the significance of the above description. Also, it is shown how this model of security can be used to design a wireless network and provide an early estimate of different network and security parameters of a network. Moreover, other kinds of attacks, e.g., known-key attack, interleaving attack etc. can be modeled in this framework. The design of a wireless sensor network that improves security against any attack serves a lot of useful purposes. Further, the plots shown herein can also used as design charts that can provide an early estimate of different parameters during wireless sensor network installation.

Figure 15:
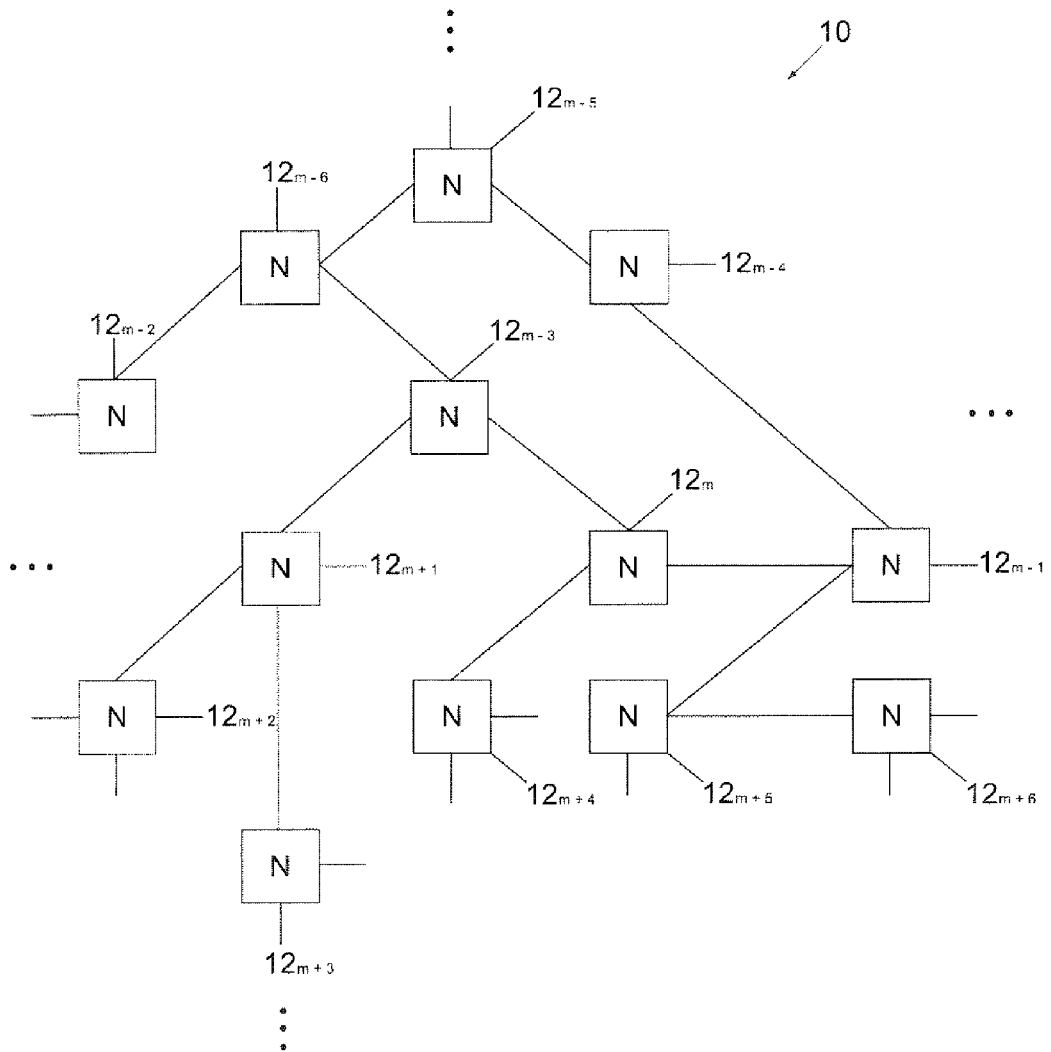
FIG. 15 is an example of wireless sensor network that can be designed in accordance with the description below.

FIG. 15 shows a network 10 which is an example of a network that can be designed in accordance with the description herein. The network comprises nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$. The network 10, for example, may be a sensor network such as a wireless sensor network. Accordingly, the links between the nodes $12_1, \ldots, 12_{m-6}, 12_{m-5}, 12_{m-4}, 12_{m-3}, 12_{m-2}, 12_{m-1}, 12_m, 12_{m+1}, 12_{m+2}, 12_{m+3}, 12_{m+4}, 12_{m+5}, 12_{m+6}, \ldots, 12_n$ may be wireless links such as infrared links, ultrasonic links, RF links, or any other type of wireless link. Alternatively, these links may be provided by electrical wires, optical fiber cables, or other physical connections between the nodes.

As shown in FIG. 15, each of the nodes may be in direct communication (e.g., within transmission range) with one or more other nodes and may be in indirect communication with one or more of the remaining nodes. For example, the node $12_{m-3}$ is in direct communication with the nodes $12_{m-6}, 12_m,$ and $12_{m+1}$, and is in indirect communication with other nodes such as the nodes $12_{m-2}$ and $12_{m-5}$ through node $12_{m-6}$. The nodes $12_{m-6}, 12_m,$ and $12_{m+1}$ are considered to be one-hop neighbors of the node $12_{m-3}$ because they are within the transmission range of the node $12_{m-3}$.

Figure 16:
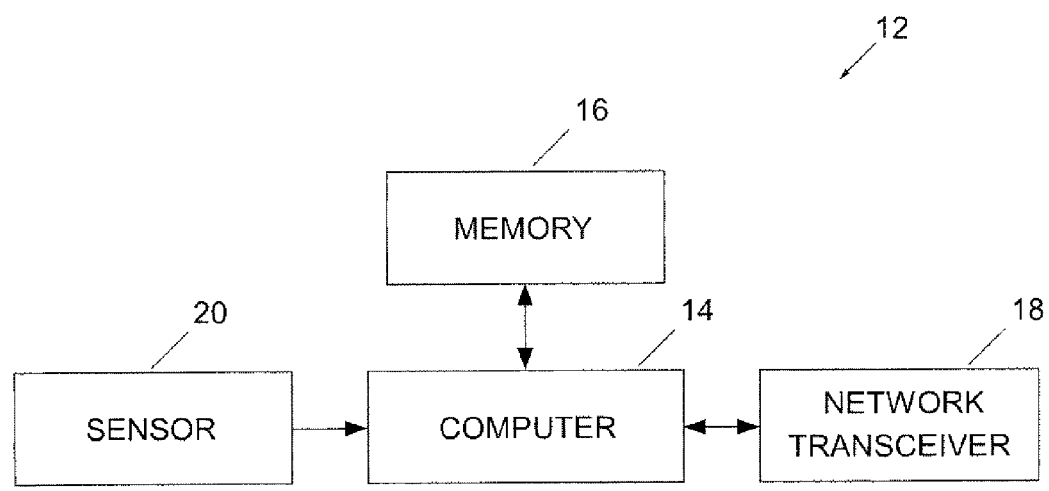
FIG. 16 is an example of an architecture that can be used for one or more of the sensor nodes in the wireless sensor network of FIG. 15.

As shown in FIG. 16, the node 12, which, for example, has an architecture that may be representative of the architecture of the other nodes shown in FIG. 1, includes a computer 14, a memory 16, and a network transceiver 18.

The memory 16 may store a program whose execution by the computer 14 implements functions assigned to that node. The program may vary from node to node.

The network transceiver 18 permits communication between the node 12 and the other nodes in the network 10. The network transceiver 18 supports communication with other nodes of the network 10 such as the one-hop neighbors of the node 12. The communications transmitted or received by the network transceiver 18 can be wireless communications over wireless links as discussed herein. Alternatively, the communications transmitted or received by the network transceiver 18 can be communications over physical or other links as also discussed herein.

In the case where the node 12 is a sensor node, the node 12 also includes a sensor 20. The sensor 20 can be any sort of sensor suitable for the particular application of the network 10. The particular condition sensed by the sensor 20 may vary from node to node.

Figure 17:
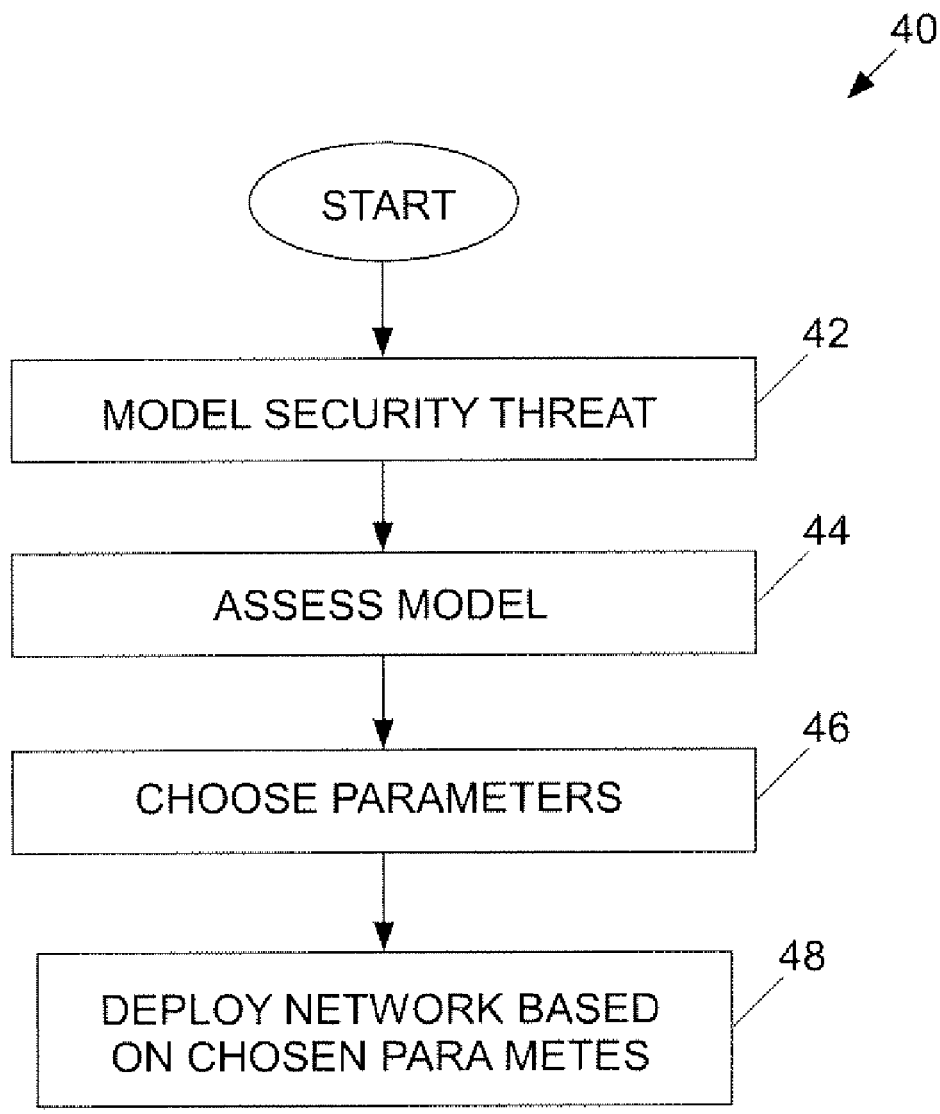
FIG. 17 illustrates a procedure for designing and/or deploying the nodes in the network; and, FIG. 18 illustrates an example of a computer on which at least a portion of the procedure of FIG. 17 can execute.

FIG. 17 illustrates a procedure 40 for designing and/or deploying the nodes in the network 10. During execution of the procedure 40, the security threat to the network 10 is modeled at 42 using the probabilistic automaton approach represented by equation (3) and/or the polynomial pool based key pre-distribution approach represented by equation (5).

At 44, the model is assessed against the threat parameter $\in$ by varying certain parameters in the model. For example, if the model of equation (3) is used, the parameters N and d may be varied in the model in order to determine their effect on the threat parameter $\in$. If the model of equation (5) is used, the parameters $N_C/N$ and t may be varied in the model in order to determine their effect on the threat parameter $\in$.

At 46, a set of parameters is chosen to meet the design criteria established by the designer of the network. For example, the set of parameters producing the lowest threat parameter $\in$ may be chosen. On the other hand, the set of design parameters producing the lowest threat parameter $\in$ may not be desirable if these design parameters do not meet other needs of the designer. Therefore, the threat parameter $\in$ may be balanced against the parameters by choosing a set of design parameters that reduce the threat parameter $\in$ to an acceptable although not lowest level.

Once the design parameters are chosen at 46, the network may be deployed at 48 in accordance with these design parameters.

Figure 18:
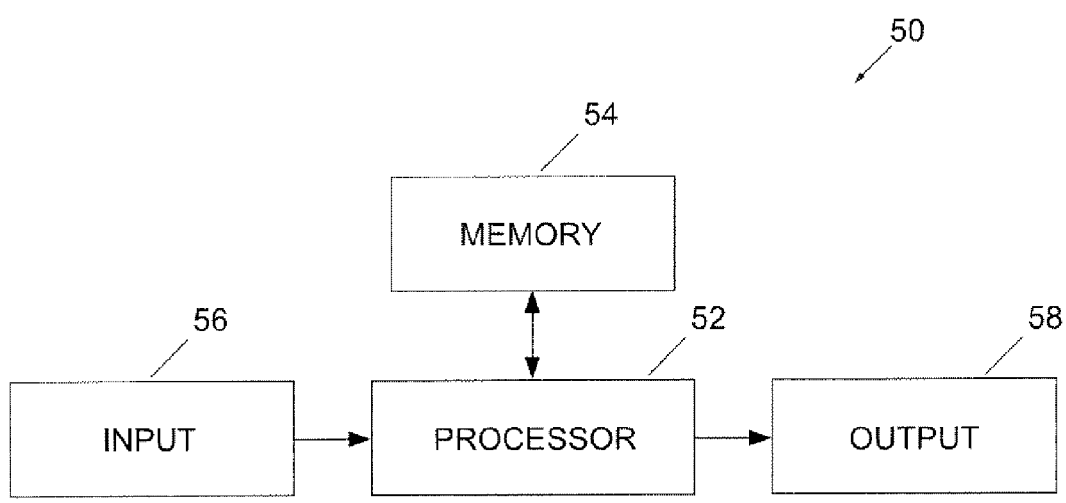

The procedure 40 may be executed in any desired manner and/or using any desired equipment to facilitate execution. For example, the procedure 40 may be executed as a matter of convenience on a computer 50. The computer 50 is shown in FIG. 18 and has a processor 52, memory 54, an input 56 such as a keyboard, a mouse, etc., and an output 58 such as a monitor, a printer, etc. The memory 54 stores one or more portions of the procedure 40, and the processor 52 executes the procedure 40.

Certain modifications of the present invention have been discussed above. Other modifications of the present invention will occur to those practicing in the art of the present invention. For example, the network as described above is a wireless network. However, the present invention is applicable to other networks.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

We claim:

1. A method executed on a computer for designing a wireless sensor network topography comprising:

assessing a degree of security of the wireless sensor network against a security threat to the wireless sensor network; and, estimating network design parameters for a design of the wireless sensor network topography as a function of the degree of security, wherein the design parameters comprise at least one of N and d, wherein N is a number of nodes, and wherein d is based on a reach of each node in the network, wherein the assessing of a degree of security further comprises assessing a tolerance to the security threat, wherein the tolerance is denoted as $\in$, wherein the design parameters are arbitrated according to the following function:

$$f(N, d, \varepsilon) \triangleq \frac{p_{d_0}}{(1-p_{d_0})}\left[\frac{1}{2(N-1)}(1-p_{d_0})(1-p)\left(1+p^d(2-p)^d\right)\right]^K - \varepsilon = 0$$

wherein κ is a polynomial in N, wherein M is a number of authentication tags used by the nodes during identity authentication, wherein $p_{d_0}=1/M$, wherein p is the probability that two of the nodes in the network do not share a common key and is given by the following equation:

$$p = \frac{\binom{s}{s'}}{\binom{s}{s'}} \times \frac{\binom{s-s'}{s'}}{\binom{s}{s'}} = \frac{((s-s')!)^2}{(s-2s')!s!}$$
$$= \left(1 - \frac{s'}{s}\right)\left(1 - \frac{s'}{s-1}\right) \cdots \left(1 - \frac{s'}{s-s'+1}\right)$$

wherein s is a number of keys in a pool from which keys to be assigned to each of the nodes are chosen, and wherein s' is a number of keys assigned to each of the nodes.

2. The method of claim 1 further comprising:
pre-distributing keys amongst the nodes of the wireless sensor network;
estimating a key distribution shared between a pair of the nodes; and,
verifying the shared key distribution mutually by the pair of nodes to establish the degree of authenticity.

3. The method of claim 2 further comprising distributing the nodes in accordance with the design parameters.

4. The method of claim 1 further comprising distributing the nodes in accordance with the design parameters.

5. A method executed on a computer for designing a wireless sensor network topography comprising:
assessing a degree of security of the wireless sensor network against a security threat to the wireless sensor network; and,
estimating network design parameters for a design of the wireless sensor network topography as a function of the degree of security, wherein the design parameters comprise at least one of $N_c/N$ and t, wherein $N_c/N$ is a fraction of compromised nodes $N_c$ to a total number of nodes N in the network, and wherein t is a maximum number of nodes that can be compromised without an attacker discovering keys used by the nodes, wherein the assessing of a degree of security further comprises assessing a tolerance to the security threat, wherein the tolerance is denoted as ∈, and wherein the design parameters are arbitrated according to the following function:

$$f(N_C/N, t, \varepsilon) \triangleq P_{secure}^{(k-1)} \cdot P_{insecure} - \varepsilon \quad (5)$$

wherein $P_{secure}$ is given by the following equation:

$$P_{secure} = (1 - P_{cd})(1 - Pd_q)\left[p + (1-p)\left(1 - \frac{N_c}{N}\right)(1 - P_{cd})\right]$$

wherein $P_{insecure}$ is given by the following equation:

$$P_{insecure} = 1 - P_{secure}$$

wherein $P_{cd}$ is given by the following equation:

$$P_{cd} = 1 - \sum_{i=0}^{t} P[i \text{ comprised shares}].$$

wherein P[i comprises shares] is given by the following equation:

$$P[i \text{ compromised shares}] = \frac{N_c!}{(N_c-i)!i!}\left(\frac{s'}{s}\right)^i\left(1 - \frac{s'}{s}\right)^{(N_c-i)}$$

wherein κ is a polynomial in N, wherein $N_C/N$ is the at least one design parameter, wherein $pd_q$ is a maximum value of ∈ such that the adversary is an (∈,q) forger, wherein p is the probability that two of the nodes in the network do not share a common key and is given by the following equation:

$$p = \frac{\binom{s}{s'}}{\binom{s}{s'}} \times \frac{\binom{s-s'}{s'}}{\binom{s}{s'}} = \frac{((s-s')!)^2}{(s-2s')!s!}$$
$$= \left(1 - \frac{s'}{s}\right)\left(1 - \frac{s'}{s-1}\right) \cdots \left(1 - \frac{s'}{s-s'+1}\right)$$

wherein s is a number of keys in a pool from which keys to be assigned to each of the nodes are chosen, and wherein s' is a number of keys assigned to each of the nodes.

6. The method of claim 5 further comprising distributing the nodes in accordance with the design parameters.

7. The method of claim 5 further comprising:
pre-distributing keys amongst the nodes of the wireless sensor network;
estimating a key distribution shared between a pair of the nodes; and,
verifying the shared key distribution mutually by the pair of nodes to establish the degree of authenticity.

8. The method of claim 7 further comprising distributing the nodes in accordance with the design parameters.

9. A method executed on a computer for designing a wireless sensor network topography comprising:
modeling the network as a function of at least one design parameter and at least one threat parameter ∈;
assessing the model by varying at least one design parameter to determine an effect on the threat parameter ∈; and,
choosing a value for the design parameter for designing the wireless network topography, wherein the value is based on the assessment that produces an acceptably low value for the threat parameter ∈, wherein the modeling of the network comprises modeling the network based on a probabilistic key sharing automaton, wherein the modeling of the network based on a probabilistic key sharing automaton comprises modeling the network based on the following function:

$$f(N, d, \varepsilon) \triangleq \frac{p_{d_0}}{(1-p_{d_0})}\left[\frac{1}{2(N-1)}(1-p_{d_0})(1-p)\left(1 + p^d(2-p)^d\right)\right]^\kappa - \varepsilon = 0$$

wherein N is the at least design parameter and is the total number of nodes in the network, wherein κ is a polynomial in N, wherein M is a number of authentication tags used by the nodes during identity authentication, wherein $pd_0 = 1/M$, wherein p is the probability that two of the nodes in the network do not share a common key and is given by the following equation:

$$p = \frac{\binom{s}{s'}}{\binom{s}{s'}} \times \frac{\binom{s-s'}{s'}}{\binom{s}{s'}} = \frac{((s-s')!)^2}{(s-2s')!s!}$$

$$= \left(1 - \frac{s'}{s}\right)\left(1 - \frac{s'}{s-1}\right)\cdots\left(1 - \frac{s'}{s-s'+1}\right)$$

wherein s is a number of keys in a pool from which keys to be assigned to each of the nodes are chosen, wherein s' is a number of keys assigned to each of the nodes, and wherein d is another design parameter and is dependent on a number of nodes within a transmission range of any given node in the network.

10. The method of claim 9 further comprising distributing the nodes in accordance with the design parameters.

11. The method of claim 9 further comprising:
    pre-distributing keys amongst the nodes of the wireless sensor network;
    estimating a key distribution shared between a pair of the nodes; and,
    verifying the shared key distribution mutually by the pair of nodes to establish the degree of authenticity.

12. The method of claim 11 further comprising distributing the nodes in accordance with the design parameters.

13. A method executed on a computer for designing a wireless sensor network topography comprising:
    modeling the network as a function of at least one design parameter and at least one threat parameter ∈;
    assessing the model by varying at least one design parameter to determine an effect on the threat parameter ∈; and,
    choosing a value for the design parameter for designing the wireless network topography, wherein the value is based on the assessment that produces an acceptably low value for the threat parameter ∈, wherein the modeling of the network comprises modeling the network based on a polynomial pool based key pre-distribution probabilistic automaton, wherein the modeling of the network based on a polynomial pool based key pre-distribution probabilistic automaton comprises modeling the network based on the following function:

$$f(N_C/N, t, \varepsilon) \triangleq P_{secure}^{(k-1)} \cdot P_{insecure} - \varepsilon \quad (5)$$

wherein $P_{secure}$ is given by the following equation:

$$P_{secure} = (1 - P_{cd})(1 - Pd_q)\left[p + (1-p)\left(1 - \frac{N_c}{N}\right)(1 - P_{cd})\right]$$

wherein $P_{insecure}$ is given by the following equation:

$$P_{insecure} = 1 - P_{secure}$$

wherein $P_{cd}$ is given by the following equation:

$$P_{cd} = 1 - \sum_{i=0}^{t} P[i \text{ comprised shares}].$$

wherein P[i comprises shares] is given by the following equation:

$$P[i \text{ compromised shares}] = \frac{N_c!}{(N_c - i)!i!}\left(\frac{s'}{s}\right)^i\left(1 - \frac{s'}{s}\right)^{(N_c - i)}$$

wherein N is the total number of nodes in the network, wherein κ is a polynomial in N, wherein $N_C$ is an assumed number of sensor nodes that are compromised by an adversary, wherein $N_C/N$ is the at least one design parameter, wherein t is another design parameter and is a number of nodes that an adversary must compromise in order to determine non-compromised keys, wherein $pd_q$ is a maximum value of ∈ such that the adversary is an (∈,q) forger, wherein p is the probability that two of the nodes in the network do not share a common key and is given by the following equation:

$$p = \frac{\binom{s}{s'}}{\binom{s}{s'}} \times \frac{\binom{s-s'}{s'}}{\binom{s}{s'}} = \frac{((s-s')!)^2}{(s-2s')!s!}$$

$$= \left(1 - \frac{s'}{s}\right)\left(1 - \frac{s'}{s-1}\right)\cdots\left(1 - \frac{s'}{s-s'+1}\right)$$

wherein s is a number of keys in a pool from which keys to be assigned to each of the nodes are chosen, and wherein s' is a number of keys assigned to each of the nodes.

14. The method of claim 13 further comprising distributing the nodes in accordance with the design parameters.

15. The method of claim 13 further comprising:
    pre-distributing keys amongst the nodes of the wireless sensor network;
    estimating a key distribution shared between a pair of the nodes; and,
    verifying the shared key distribution mutually by the pair of nodes to establish the degree of authenticity.

16. The method of claim 15 further comprising distributing the nodes in accordance with the design parameters.

* * * * *